United States Patent
Gopalakrishnan et al.

(10) Patent No.: US 6,952,410 B2
(45) Date of Patent: Oct. 4, 2005

(54) SEMI-STATIC CODE SPACE DIVISION FOR MULTIPLE SHARED PACKET DATA CHANNELS IN HIGH BANDWIDTH MIXED SERVICE CDMA SYSTEMS

(75) Inventors: Nandu Gopalakrishnan, Chatham, NJ (US); Ashok N. Rudrapatna, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 798 days.

(21) Appl. No.: 09/793,219

(22) Filed: Feb. 26, 2001

(65) Prior Publication Data

US 2002/0118697 A1 Aug. 29, 2002

(51) Int. Cl.[7] .............................................. H04B 7/216
(52) U.S. Cl. ...................... 370/335; 370/342; 370/441; 370/337
(58) Field of Search ................................ 370/329, 468, 370/336, 337, 441, 436, 247, 321, 342, 335, 320

(56) References Cited

U.S. PATENT DOCUMENTS

| | | | | |
|---|---|---|---|---|
| 5,533,013 A | * | 7/1996 | Leppanen | 370/342 |
| 5,577,024 A | * | 11/1996 | Malkamaki et al. | 370/335 |
| 6,064,662 A | | 5/2000 | Gitlin et al. | 370/330 |
| 6,275,488 B1 | * | 8/2001 | Cudak et al. | 370/347 |
| 6,490,262 B1 | * | 12/2002 | Hogger | 370/337 |
| 6,526,036 B1 | * | 2/2003 | Uchida et al. | 370/342 |
| 6,535,503 B1 | * | 3/2003 | Toskala et al. | 370/349 |
| 6,590,878 B1 | * | 7/2003 | Uchida et al. | 370/330 |
| 6,611,509 B1 | * | 8/2003 | Hayashi et al. | 370/335 |
| 2002/0003782 A1 | * | 1/2002 | Pan et al. | 370/280 |
| 2002/0034171 A1 | * | 3/2002 | Smith et al. | 370/337 |

FOREIGN PATENT DOCUMENTS

EP  1 187 371 A1  3/2002  .............. H04B/7/26

* cited by examiner

*Primary Examiner*—Ajit Patel
*Assistant Examiner*—Steven A Blount

(57) ABSTRACT

A method of providing an efficient channel structure for a communication system that uses codes to define its communication channels. Available codes form a code space that is equally divided into M tiers based on load conditions; M is an integer equal to 1 or greater. Information is scheduled to be transmitted during a particular time slot and is assigned to a particular tier. The information is transmitted during the scheduled time slot using all of the codes of the assigned tier.

17 Claims, 2 Drawing Sheets

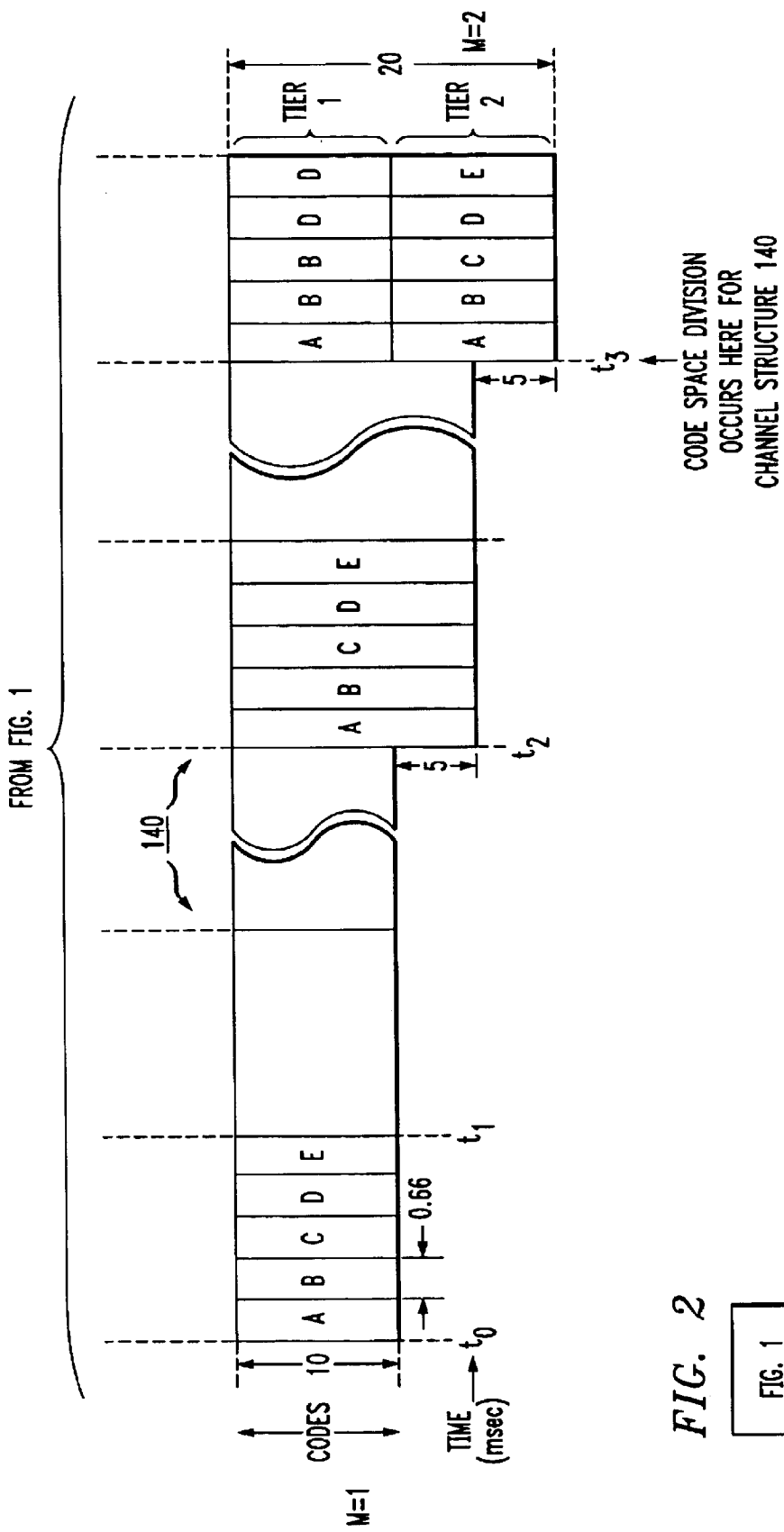

SEMI-STATIC CODE SPACE DIVISION FOR MULTIPLE SHARED PACKET DATA CHANNELS IN HIGH BANDWIDTH MIXED SERVICE CDMA SYSTEMS

BACKGROUND OF THE INVENTION

1. Field of the Invention

The present invention generally relates to communications; more specifically, wireless communications.

2. Description of the Related Art

In certain wireless communication systems such as Code Division Multiple Access (CDMA) communication systems, communication channels are defined by using codes (e.g., orthogonal Walsh codes) that are part of a set of codes or a code space. Typically, a user of the communication system is assigned one or more codes that the user uses to convey (i.e., transmit and/or receive) information. The information, which can be voice or data (e.g., graphics, text, digitized video), will have different channel requirements depending on its type. Base Station equipment, which is part of the system equipment of the communication system, will assign certain users to certain channel codes based on the characteristics of the user information. For example, users that are conveying voice signals will have priority over users conveying data information; this is because voice signals are time sensitive in that very little or no delay is allowed to occur from the time a voice signal is received by the base station equipment to the time the base station equipment transmits such a signal. Data information, on the other hand, can tolerate delays in transmissions and can therefore be processed in a more flexible fashion by the base station equipment. The set of communication channels over which information is transmitted by the base station equipment to users of a wireless communication system is commonly referred to as the downlink.

In mixed service communication systems (i.e., systems that convey both voice and data information), the efficiency of the channel usage for data information is critical because of the priority given to the voice information. The base station assigns a portion of the codes to the voice information, which the base station has scheduled to be transmitted over the downlink; the remaining codes (i.e., the available code space) are then made available for conveyance of data information. As the capacity of the system increases, the probability of the need to transmit a relatively large amount of data at a particular instant of time also increases. However, because of the bursty nature of data, the need to transmit a relatively large amount of data is usually transitory; that is, at one instant, a large amount of data is scheduled to be transmitted and at another instant, very little or no data is scheduled to be transmitted. Typically, for CDMA communication systems, information (i.e., voice or data) is transmitted during a chosen time period or time slot referred to as the Transmission Time Interval (TTI). Also, the downlink for a specific user has a certain data rate (i.e., the number of bits per second that can be transmitted over the link at a particular instant of time) designated as $R_{channel}$. It should be noted that $R_{channel}$ does not necessarily remain constant; it changes based on varying channel conditions. Because the number of codes available for data transmission is limited by the voice information being transmitted by the system, the allocation of code space to users in a manner that promotes relatively highly efficient channel usage for data information becomes crucial.

A first solution for improving the efficiency of channel usage for data information is to allocate a certain number of codes (from the available code space) to each scheduled user according to the user's data rate requirement. Each scheduled user, which has been allocated a certain number of codes, is then allowed to transmit its data information during the entire TTI. In this manner, the channel is used efficiently and users are given the proper amount of resources they need to transmit their data information. For example, suppose 5 users (users A, B, C, D, E) are scheduled to receive data information during a particular TTI. User A is to receive 20,000 bits of information, user B is to receive 30,000 bits of information, user C is to receive 40,000 bits of information, user D is to receive 5,000 bits of information and user E is also to receive 5,000 bits of information. Suppose further that the channel data rate for each user for this particular TTI is 100,000 bits per second (bps) or 100 Kbps where the particular TTI is one second in length and there are 100 codes available. Thus, the data rate for user A is 20 Kbps, (i.e., 20,000 bits÷1 sec.) for user B, 30 Kbps, for user C, 40 Kbps, for user D, 5 Kbps and for user E, 5 Kbps. User A thus has a need for 20% of the channel resources and accordingly is allocated 20 codes from the 100 available codes. Likewise, User B is given 30 codes, user C is given 40 codes and users D and E are each given 5 codes. The packing efficiency—which is defined as the ratio of the data rate required by a scheduled user to the data rate allocated to that user—for each of the 5 users is therefore 100%. The packing efficiency is a particular measure of downlink efficiency; other similar measures can be used as indicators of efficiency. Suppose for User D, just prior to transmission, for some reason half of the data bits are no longer available. Now user D needs to transmit 2500 bits over the one second TTI or 2.5 Kbps instead of 5 Kbps. If user D is still allocated 5 codes, the packing efficiency for user D decreases to 50%. An additional 2500 bits of filler bits would have to be transmitted with the 2500 bits of data information to meet the 5 Kbps allocation; this represents a wasteful and therefore inefficient use of channel resources. A better use of the channel resources, would be, if possible, to allocate 3 codes to user D allowing it to transmit up to 3000 bits over the one second TTI thus increasing its packing efficiency to 83.33%. The remaining 2 codes would then be available for other users which need a data rate of 2000 bps or less.

One problem with the solution described above is that for each TTI, the base station equipment has to determine how to allocate the available code space to the number of data users scheduled for the TTI. In order to determine the code space allocation for each of the users scheduled for the upcoming TTI, a signaling or overhead channel is created within which information about the data rate needs of each scheduled user (plus other information) is transmitted by the users to the base station. The signaling or overhead channel represents additional resources (e.g., radio equipment usage, codes allocated to the scheduled user or users) that the communication system uses to accomplish the necessary communications. Further, a separate allocation must be done for each new TTI because the number of codes available for data transmission and the data rate of the downlink (i.e., $R_{channel}$) and the amount of data to be transmitted to each user can change for each new TTI. Also, because all of the information for the scheduled users is transmitted simultaneously during the entire TTI, the channel conditions experienced by some of these users during portions of the TTI may cause these users to have unacceptable throughputs. The subset of codes allocated to each user has to be communicated by the base station to each user during every TTI via the overhead and/or signaling information; this will further reduce each user's throughput. The throughput is the amount of information (e.g., number of bits) successfully received by the user over a defined time period. It would be desirable to schedule these users using a reduced TTI such that each user is appropriately scheduled and uses all of the available codes for transmission resulting in an improved throughput; a second solution uses this approach.

In the second solution, the amount of time for transmission of data information is reduced to a relatively smaller time slot of a certain duration and all of the available codes are allocated to a particular user for which data transmission is being performed. In this solution, the total available code space is broadcast to all users at a relatively low rate corresponding to the slow rate of change of available codes; this results in less overhead compared to the first solution. In essence, for each scheduled user, data information is transmitted at the data rate of the user's downlink, $R_{channel}$, using all of the available codes. The total throughput for this second solution is typically much higher compared to the first solution because the second solution allows for more flexible scheduling. Each user is assigned to one or more time slots depending on the data rate of the downlink, the data rate requirement of the user and the channel conditions during the particular time slots. One advantage of this solution is that variations in the channel conditions can be exploited so that stronger users are given priority over weaker users in scheduling resulting in increased throughput for the downlink. The base station receives signaling information from users regarding the throughput of each user. The base station equipment might schedule data transmission for a particular user prior to any other waiting user data because that user's throughput is higher than the throughput of any of the other waiting users. For example, the base station equipment may determine that out of the five users, user C has the best throughput. Therefore, user C's data information would be transmitted first. For the sake of illustration, suppose the time slot is 0.666 msec. in duration and there are 10 codes available for data transmission. Suppose further that $R_{channel}$ is 15.15 Mbps for all of the waiting users. Thus, using the same users and corresponding data rate values in the first solution discussed above, user C, which has a data amount of 40,000 bits, would be allocated four time slots whereby in each time slot 0.666 msec×15.15 Mbps=10,000 bits of data information can be transmitted and all of the available codes are used for each transmission. The base station would perform a similar determination for the remaining four users and schedule each of them accordingly. Suppose that $R_{channel}$ does not change for each of the remaining users, then at their scheduled transmission times, user A would be allocated two time slots, user B would be allocated three time slots and users D and E would be allocated one time slot each. The packing efficiency for users A, B, and C would be 100% and the packing efficiency for user D and E would be only 50% since each time slot allows a data rate of up to 10 Kbps and only 5,000 bits are being transmitted for users D and E respectively.

A major problem with the second solution is that the number of available codes may be relatively large resulting in significant portions of the time slots being wasted since the achievable data rate of each time slot increases as the total number of available codes increases and available data to be transmitted to each user is relatively small. For example, continuing with the above example, suppose at some time later, user C still has a data amount of 40 Kilobits but the number of available codes has increased from 10 codes to 20 codes. In such an instance only half of the time slot would be needed to transmit data information for user C reducing the packing efficiency from 100% to 50%. Similar occurrences with other users will have the net effect of decreasing the overall efficiency of the downlink.

What is therefore needed is a method for maintaining or even increasing the efficiency of a downlink of a communication system—that uses codes to define its channel structure—as the number of available codes varies.

SUMMARY OF THE INVENTION

The present invention provides a method for an efficient channel structure used to transmit information in a communication system that uses codes to define its communication channels. Codes, which are available for use in the transmission of information over the communication channel, form an available code space. Information is transmitted during time slots using the entire available code space. Based on load conditions, the code space is divided into M tiers where M is an integer equal to 1 or greater. The transmissions are scheduled for particular time slots and assigned to particular tiers whereby the entire set of codes for an assigned tier is used during such transmissions. In this manner, the communication channel's efficiency can be maintained or even increased.

DETAILED DESCRIPTION

Figure 1:
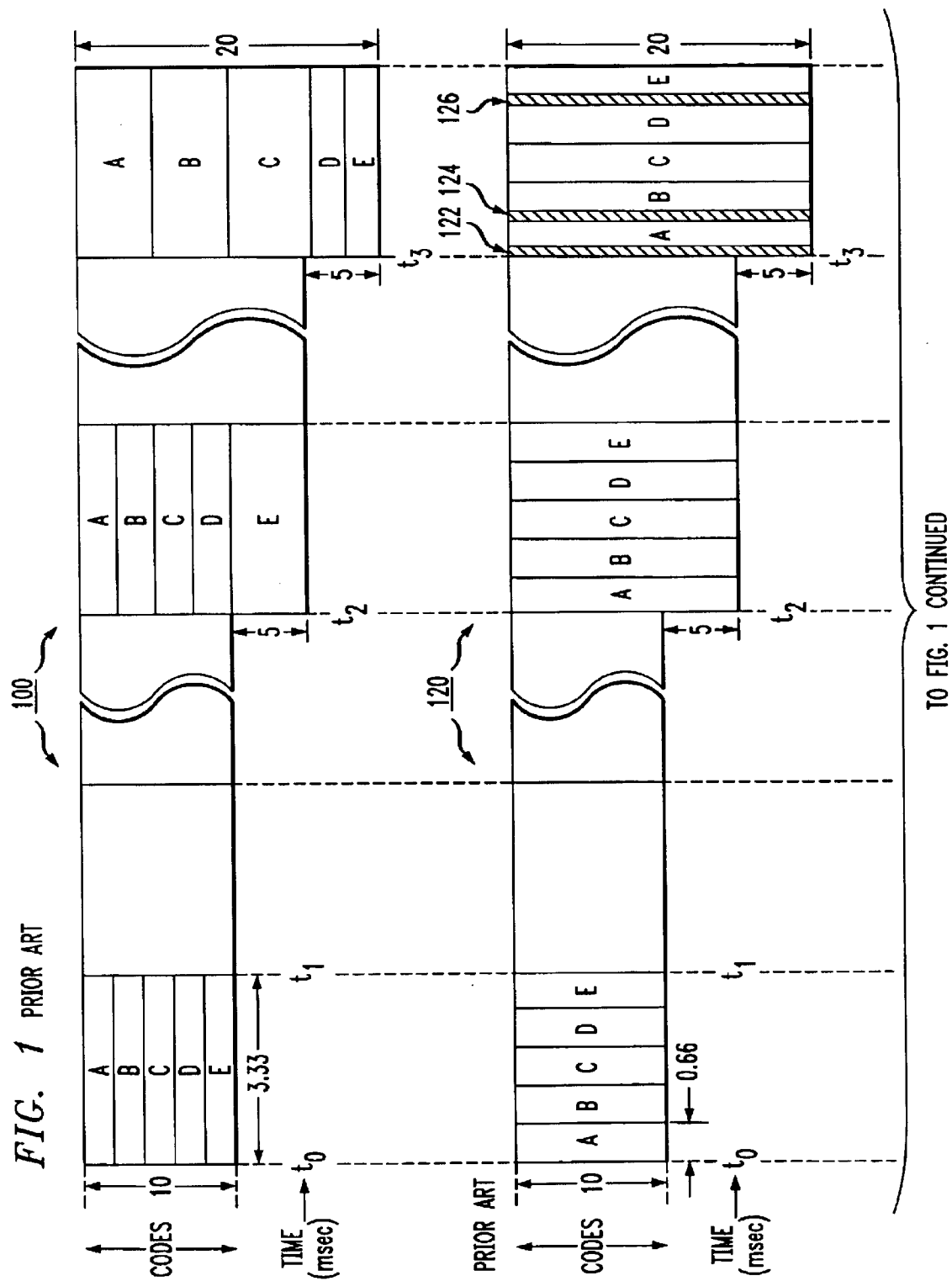
FIG. 1 depicts a channel structure resulting from the application of the method of the present invention and prior art channel structures.

The present invention is a method for providing an efficient channel structure for a communication system that uses codes to define its communication channels. The method of the present invention divides the available code space of the communication system into M tiers or subspaces based on load conditions such as the number of codes available, the number of users available to use the codes, the typical amount of information to be transmitted for particular application used by the users; M is an integer equal to 1 or greater. The load conditions are any system or user factors that affect the efficiency of a user's downlink. The specific load conditions discussed above represent some of the key factors or combination of factors that affect the efficiency (i.e., the packing efficiency) of the communication channel. The method of the present invention is certainly not limited to the above load conditions. The code space is divided whenever particular combinations of values of these load conditions occur. Each transmission is scheduled to occur during a particular time slot and in a particular tier whereby all of the codes of the particular tier is used during the transmission. The transmissions are scheduled in accordance with well known scheduling algorithms and are performed over a link (e.g., downlink) of a communication system. The rate at which these particular combinations of load condition values change is relatively less than the rate at which transmission of information associated with particular users is scheduled. Therefore, the code space division occurs at a semi-static rate. It should be noted that the division of the code space is done prior to or at the beginning of a time slot and the division can either maintain, increase or decrease the number of tiers. It should also be noted that an implementation of the method of the present invention allows for the transmission of accompanying signaling information along with the user information (e.g., data information). The user information can be any type of information typically conveyed over a communication system to users of that system. The method of the present invention is performed by a base station or other system equipment or both.

Referring now to FIG. 1, there is shown a channel structure, 140, resulting from the application of the method of the present invention along with prior art channel structures 100 and 120. For ease of explanation, the method of the present invention will be explained in the context of a communication system that complies with the Universal Mobile Telecommunications System (UMTS), UMTS Terrestrial Radio Access (UTRA) standard that uses CDMA technology. Further, the particular example of the communication channel described is a downlink UMTS channel commonly referred to as a High Speed Downlink Shared Channel (HS-DSCH) and the information being transmitted is data information. It should be understood that the method of the present invention is not limited to any particular communication link or any particular communication system and is applicable to any communication system that uses codes to define its channel structure. Further, the method of the present invention is applicable to the transmission of any type of information (e.g., voice, data).

Still referring to channel structure 140 of FIG. 1, five users (users A, B, C, D, and E) are scheduled prior to or at time to in accordance with a well known scheduling algorithm. The method of the present invention defines time slots within which transmission of information occurs. As shown for channel structure 140, each time slot or TTI is 0.666 milliseconds long. The time slot duration can be any integer multiple of 0.666 milliseconds. For communication systems other than UMTS compliant systems, the time slot duration can be, for example, any integer multiple of 1.25 milliseconds or any multiple integer of 1.67 milliseconds. It should be understood, however, that the method of the present invention is not limited to any particular time slot duration. Prior art channel structure 100 shows the TTI equaling 3.33 milliseconds. Note that as discussed in the background section with reference to the first solution, prior art channel structure 100 does not use the reduced time slots of length 0.666 msec. because of code multiplexing users over 3.33 milliseconds. As illustrated, at time $t_0$, the number of available codes equals 10. Time $t_0$ indicates the beginning of a TTI and time $t_1$ indicates the end of that TTI for prior art channel structure 100. Prior to the occurrence of each 0.666 msec. time slot, the method of the present invention determines the following:

(a) which block or packet of information to be transmitted to a user is to be scheduled. The scheduling algorithm decides which block of information is to be transmitted based on the throughput of a user and the current channel conditions of the downlink. The conditions of the downlink include such parameters as the data rate that can be provided by the downlink.

(b) whether to divide the available code space whereby such division is based on such load conditions as the number of codes available, the number of users to be served, the typical amount of information to be transmitted for the application being transmitted by a user, and various conditions of the downlink.

One particular implementation of the method of the present invention is for the base station equipment to provide a lookup table for M based on statistical analysis of the entire downlink where such a lookup table contains values for the load conditions considered at step (b). Another implementation is that the base station executes an algorithm that takes into account different load conditions at different times for triggering the proper code space division and for determining the value for M. When M=1, no code space division occurs. Additionally, when M does not change, no new division of the code space occurs, i.e., the number of tiers does not change. For example, still referring to channel structure 140, M=1 at time $t_0$ and two slots later, prior to transmission of information associated with user C, the lookup table points to a value of M=1; therefore no division occurs. Still referring to channel structure 140, at time $t_2$ the number of available codes increases by 5 to a total of 15. The lookup table still points to a value of M=1 and therefore no code space division occurs.

At time $t_3$, 5 more codes become available making the total number of codes equal to 20. It should be noted that, for prior art channel structure 120 due to an increase in available codes and possibly other load conditions, time slots assigned to users A, B and E have to be filled with padded bits indicated by portions 122, 124 and 126 respectively. Such padded portions are examples of inefficiency due to changing channel conditions. Returning to channel structure 140, at time $t_3$ the lookup table points to a value of M=2 meaning that M is changed from 1 to 2. Thus, a code space division occurs at time $t_3$. A portion of the available code space is put into a first tier and another portion is put into a second tier. The method of the present invention has determined that based on load conditions (e.g., the number of data users available, the number of codes available, amount of information to be transmitted characteristic of a user application), the code space should be divided into two tiers. Therefore, each time slot is divided into two sets of codes where each set of code and a particular time slot are referred to as an information space. For example, for each slot, the set of codes for tier 1 is an information space and the set of codes for tier 2 is another information space. Each information space can be delineated with two indices where the first index is a designation for the time slot and the second index is a designation for the tier. For example, the method of the present invention has assigned information space (1,1) and (1,2) to user A where (1,1) means first time slot in tier 1 and (1,2) means first time slot in tier 2. A transmission can be assigned to any available unit of information space or combinations thereof. Each unit of information space can be assigned to any user. There is no requirement that a user be assigned to information spaces of the same time slot or of the same tier. As shown in channel structure 140, for the third time slot after the occurrence of $t_3$, user B is assigned to information space (3,1) while user C is assigned to information space (3,2).

Other indexing methods can be used by the method of the present invention. For example, the codes are typically generated according to a well known code tree structure where each code has a specific index number associated with it. Thus, the ordering of the codes and their grouping into tiers can typically be done on the basis of their pre-designated index numbers or code indices. Typically, the code tree structure and how it is generated are known by the users. Therefore, when a code space division occurs the base station communicates (e.g., broadcasts) the mapping of a new available code space structure (i.e., the new portion of the code tree) by using bits that indicate the indices corresponding to the available codes in all tiers (i.e., in each of the M tiers).

The available code space is divided such that the number of codes in each tier is equal. However, when the number of available codes cannot be equally divided into an integer, the method of the present invention applies the following 'equal division procedure': the method of the present invention divides the largest number of codes that can be divided equally into an integer and then distributes the remainder of the codes equally amongst the tiers starting with the highest tier. For example, suppose the number of available codes at time $t_3$ is 23. The largest number of codes that can be divided equally by 2 is 22 (i.e., 11 codes per tier) with one code remaining. The remaining code is put into tier 1 resulting in tier 1 having 12 codes and tier 2 having 11 codes. Other techniques for equally dividing the available code space into the requisite number of tiers can be used. Also, unequal division can be used whereby the 'equal division' procedure described above is not followed. It should be noted that the rate at which code space division occurs is relatively low. For example, in the illustrative channel structure 140, the first code space division occurs 1000 time slots after the first time slot or at time to $t_0$+1000TTI where each TTI is 0.666 milliseconds long; this implies a code space division rate of 1 every 666 milliseconds which is much slower than the time slot rate of 1 every 0.666 milliseconds. Typically, the load conditions that cause a code space division to occur change on the order of a 100 milliseconds or more.

The method of the present invention can be used in communication systems that use Automatic Retransmission reQuest (ARQ) protocols in which data transmitted by the base station is retransmitted at some later time because the data was not received successfully. A common implementation of ARQ in a layer 1 protocol is called a hybrid ARQ. Various hybrid ARQ techniques (e.g., Stop and Wait, synchronous, asynchronous) can be used with the method of the present invention if the retransmissions are scheduled in the same tier as the original transmission. For example, again referring to channel structure 140, immediately after $t_3$, suppose the transmission in information space (2, 2), i.e., time slot 2, tier 2, for user B was received erroneously by user B. User B would then send a negative acknowledgement (NACK) to the base station informing the base station that the information was not successfully received. In accordance with Stop-and-Wait hybrid ARQ technique being used, the information originally transmitted in information space (2,2) will be rescheduled for retransmission at some later time slot in the second tier. If there is no second tier available, meaning that the method of the present invention reverted back to only one tier prior to the scheduled time for the retransmission, then the retransmission is conducted by a protocol that is higher than the hybrid ARQ protocol. However, all first tier retransmissions can continue to be performed by this hybrid ARQ protocol.

In general, when the method of the present invention transitions from M tiers to N tiers (where N<M and typically N=M−1) then the last M−N tiers will no longer be available and thus packet recovery of information via Stop-and-Wait hybrid ARQ retransmission on these tiers will have to be aborted for recovery by higher layer protocols. N is an integer equal to 1 or greater.

Even in the case of Stop-and-Wait hybrid ARQ, the constraints described above can be removed if additional information (e.g., bits) indicating the tier number is included in the signaling information accompanying each transmission. The above constraint and method for handling hybrid ARQ retransmissions apply when the number of code space divisions changes within a cell or even when the user is handed off to a new cell. The cell represents a geographic area that is being served by a base station of a wireless communication system. A handoff is a well known procedure whereby a base station of a new cell is assigned by the system to serve a user moving from an old cell to the new cell.

We claim:

1. A method of providing an efficient channel structure over which information is transmitted in a communication system operatively supporting a plurality of users, the channel structure using codes to define its channels, the method comprising:

scheduling transmission of information for a particular time slot during which an entire available code space is used for the transmission;

dividing the available code space into M tiers based on load conditions, each tier having a code space that is a portion of the available code space and M is an integer equal to at least 1; and transmitting the information during the scheduled time slot using the entire code space of a tier assigned to one of the plurality of users.

2. The method of claim 1, wherein the scheduling of transmission information is based on a throughput and on channel conditions for a user.

3. The method of claim 2, further comprising the step of communicating a new code space structure to users of the plurality available by indices indicating code ordering and code grouping for at least some of the M tiers.

4. The method of claim 3, wherein the step of communicating a new code space structure comprises the step of broadcast signaling the divided available code space to the available users.

5. The method of claim 4, wherein the load conditions comprise at least one of a number of codes available, a number of users available, and a user application specific amount of information to be transmitted.

6. The method of claim 4, wherein the available code space is divided into m tiers by at least one of applying an equal division procedure to the available code space and applying an unequal division procedure to the available code space.

7. The method of claim 4, wherein the steps of the method are performed by base station equipment or system equipment or both.

8. The method of claim 4, wherein the step of dividing the available code space comprises executing an algorithm that takes into account various load conditions for triggering a division of the code space and for determining M.

9. The method of claim 4, wherein the step of dividing the available code space further comprises assigning a transmission to any available unit of information space or combinations thereof.

10. The method of claim 4, wherein the communication system uses a hybrid Stop-and-Wait ARQ protocol even when such a system is able to execute handoffs.

11. The method of claim 2, wherein the load conditions are semi-static such that the step of dividing the available code space into M tiers remains substantially constant for at least a plurality of time slots.

12. The method of claim 11, wherein the load conditions comprise at least one of a number of codes available, a number of users available, and a user application specific amount of information to be transmitted.

13. The method of claim 11, wherein the available code space is divided into M tiers by at least one of applying an equal division procedure to the available code space and applying an unequal division procedure to the available code space.

14. The method of claim 11, wherein the steps are performed by base station equipment or system equipment or both.

15. The method of claim 11, wherein the step of dividing the available code space comprises executing an algorithm that takes into account various load conditions for triggering a division of the code space and for determining M.

16. The method of claim 11, wherein the step of dividing the available code space further comprises assigning a transmission to any available unit of information space or combinations thereof.

17. The method of claim 11, wherein the communication system uses a hybrid Stop-and-Wait ARQ protocol even when such a system is able to execute handoffs.

* * * * *